United States Patent
de Fabrega

(10) Patent No.: US 7,647,259 B2
(45) Date of Patent: Jan. 12, 2010

(54) E-COMMERCE DEVELOPMENT INTRANET PORTAL

(76) Inventor: Ingrid Perscky de Fabrega, c/o Plaza Bancomer Building 50th Street, 16th Floor, Panama City (PA)

( * ) Notice: Subject to any disclaimer, the term of this patent is extended or adjusted under 35 U.S.C. 154(b) by 800 days.

(21) Appl. No.: 09/754,021

(22) Filed: Jan. 3, 2001

(65) Prior Publication Data

US 2001/0054019 A1 Dec. 20, 2001

(51) Int. Cl.
*G06Q 40/00* (2006.01)
(52) U.S. Cl. .......................... 705/35; 705/36
(58) Field of Classification Search ............ 705/35–36, 705/39–43, 26–27, 65, 75; 902/24, 30–32; 713/170, 201
See application file for complete search history.

(56) References Cited

U.S. PATENT DOCUMENTS

| | | | |
|---|---|---|---|
| 3,959,607 A | 5/1976 | Vargo | 179/183 |
| 4,845,636 A | 7/1989 | Walker | 364/479 |
| 5,457,305 A | 10/1995 | Akel et al. | 235/379 |
| 5,491,820 A | 2/1996 | Belove et al. | 395/600 |
| 5,572,643 A | 11/1996 | Judson | 395/793 |
| 5,587,740 A | 12/1996 | Brennan | 348/373 |
| 5,617,540 A | 4/1997 | Civanlar et al. | 395/200.11 |
| 5,623,581 A | 4/1997 | Attenberg | 395/106 |
| 5,625,781 A | 4/1997 | Cline et al. | 395/335 |
| 5,649,186 A | 7/1997 | Ferguson | 395/610 |
| 5,678,041 A | 10/1997 | Baker et al. | 395/609 |
| 5,737,729 A | 4/1998 | Denman | 705/401 |
| 5,740,161 A * | 4/1998 | Porter et al. | 370/260 |
| 5,748,889 A | 5/1998 | Weinblatt et al. | 395/187.01 |
| 5,761,071 A * | 6/1998 | Bernstein et al. | 700/237 |
| 5,774,868 A | 6/1998 | Cragun et al. | 705/10 |
| 5,774,869 A | 6/1998 | Toader | 705/10 |
| 5,781,909 A | 7/1998 | Logan et al. | 707/200 |
| 5,794,218 A | 8/1998 | Jennings et al. | 705/35 |
| 5,805,815 A | 9/1998 | Hill | 395/200.48 |
| 5,812,765 A * | 9/1998 | Curtis | 709/200 |
| 5,818,446 A | 10/1998 | Bertram et al. | 345/334 |
| 5,819,284 A | 10/1998 | Farber et al. | 707/104 |
| 5,822,216 A | 10/1998 | Satchell, Jr. et al. | 364/479.01 |
| 5,826,267 A | 10/1998 | McMillan | 707/9 |

(Continued)

FOREIGN PATENT DOCUMENTS

WO 9705733 2/1997

(Continued)

*Primary Examiner*—Thu Thao Havan
(74) *Attorney, Agent, or Firm*—Ladas & Parry LLP

(57) ABSTRACT

An intranet providing a multiple-carrel public-access kiosk provides free access to foreign and domestic informational e-commerce intranet sites as well as e-mail and public service educational and informational materials. The kiosk accepts anonymous pre-paid cards issued by a local franchisee of a network of e-commerce intranets that includes the local intranet. The paid services provided by each carrel may include video-conference and chat room time, playing and/or copying audio-visual materials such as computer games and music videos, and international e-commerce purchase support services such as customs and currency exchange. Third-party sponsored public service materials may include audio-visual instructional materials in local dialects introducing the user to the use of the kiosk's services and providing training for using standard business software programs.

16 Claims, 6 Drawing Sheets

U.S. PATENT DOCUMENTS

| | | | |
|---|---|---|---|
| 5,845,261 A | 12/1998 | McAbian | 705/26 |
| 5,845,267 A | 12/1998 | Ronen | 705/40 |
| 5,875,110 A * | 2/1999 | Jacobs | 700/232 |
| 5,905,248 A | 5/1999 | Russell et al. | 235/462 |
| 5,915,246 A | 6/1999 | Patterson et al. | 705/43 |
| 5,920,847 A * | 7/1999 | Kolling et al. | 705/40 |
| 5,949,411 A | 9/1999 | Doerr et al. | 345/327 |
| 5,953,504 A * | 9/1999 | Sokal et al. | 709/227 |
| 5,987,140 A | 11/1999 | Rowney et al. | 380/49 |
| 5,999,596 A | 12/1999 | Walker et al. | 379/91.01 |
| 6,003,019 A | 12/1999 | Eaton et al. | 705/42 |
| 6,009,429 A | 12/1999 | Greer et al. | 707/10 |
| 6,016,484 A | 1/2000 | Williams et al. | 705/39 |
| 6,035,283 A | 3/2000 | Rofrano | 705/27 |
| 6,085,177 A | 7/2000 | Semple et al. | 705/43 |
| 6,085,195 A | 7/2000 | Hoyt et al. | 707/10 |
| 6,205,433 B1 | 3/2001 | Boesch et al. | 705/26 |
| 6,233,682 B1 | 5/2001 | Fritsch | 713/168 |
| 6,243,450 B1 * | 6/2001 | Jansen et al. | 379/144.01 |
| 6,535,592 B1 * | 3/2003 | Snelgrove | 379/114.07 |
| 6,868,267 B1 * | 3/2005 | Briggs et al. | 455/406 |

FOREIGN PATENT DOCUMENTS

| | | |
|---|---|---|
| WO | 9728510 | 8/1997 |
| WO | 9813765 | 4/1998 |
| WO | WO0005670 | 2/2000 |

\* cited by examiner

E-COMMERCE DEVELOPMENT INTRANET PORTAL

BACKGROUND OF THE INVENTION

1. Field of the Invention

The present invention is related to internet access terminals. More particularly, the present invention is related to public-access internet terminals.

2. Discussion of Related Art

It is estimated that, in the United States alone, e-commerce in 1999 had gross revenues of $500 billion. Everything from shoes to cars and stock quotes, from recorded music to legal advice is now available on-line. Most of those purchases made over the internet were probably made using a personal credit card account and a personal computer at the buyer's home. In developing countries, however, less than 5% of the general population has a computer at home. Many of the rest do not have telephones at home, much less computers or internet access. Therefore it is scarcely surprising that, on average, only 2% of the population in these developing countries uses internet service. Moreover, since e-commerce is carried on mostly by reading and writing one of the major commercial languages, in geographically isolated areas local inhabitants' resulting educational and linguistic isolation can often make the "digital divide" even harder to bridge. For example, rural people in some areas of Latin American are fluent in neither Spanish nor Portuguese, speaking local non-European dialects instead.

Unfortunately, up to now, the cost of buying a computer equipment and maintaining an internet link has left many, in the United States as well as elsewhere, demographically on the wrong side of the so-called "digital divide" and, although computers are becoming omnipresent in the workplace, even people who use computers at work are not authorized to use those computers for making personal purchases. In industrialized countries, many of the people who cannot use the computer at work for personal purposes are also often commuters who average less than 12 to 14 hours at home each day, even if they do have a computer at home. In developing countries families are often pulled apart by their members moving to large urban centers or foreign countries in search of work, not returning home for months or years at a time.

Entertainment and communications services are what attract first-time users to e-commerce on the internet most often, in part because purchasing entertainment and communications services involves little or no financial risk to the use. What you see is what you get in purchasing such services, unlike mail-order purchases. Also, because anxiousness is produced by "unfamiliarity" but "novelty" is entertaining, people of all ages find changes in technology easier to accept when they are first encountered in the context of entertainment rather than in a business context. Videoconferencing is a form of communications particularly valuable to separated families, and long distance and international internet conference calls need cost no more than local video conferencing. That is certainly less expensive than travel costs involved in achieving such face-to-face contact by any other means.

If entertainment and communications services can attract the mass base needed for implementing e-commerce services in underserved areas in the United States and abroad, the high cost and rapid obsolescence of the multimedia computer equipment required by entertainment and communications services has also contributed to the persistence of that "digital divide". Incompatibly among multimedia formats and local scarcity of broadband communication service impairs the usefulness of multimedia equipment and the broadband access required by streaming multimedia data is an expensive luxury in most places. Thus at present, access to multimedia services at home, even in affluent areas, is limited to whatever equipment each person can afford to buy and is willing to update in this rapidly evolving technology.

The high cost and rapid obsolescence of multimedia equipment and infrastructures particularly unfortunate for those most in need of such facilities, those people put at a disadvantage by their present economic or geographic or linguistic isolation. Internet access could provide a bridge between them and the larger national and international marketplace to bring them out of that isolation. In particular, e-commerce is a potentially potent catalyst for further economic development in such areas, but the infrastructure and services that support e-commerce require a mass base in order to provide such benefits.

Kiosks and booths of various types that provide paid communications services to business travelers are well known, but do not address this problem. Apart from telephone service carrels an booths, U.S. Pat. No. 5,812,765 discloses an example of a public-access carrel similar to others provided in airports and other transportation hubs by subscription-based Internet service providers (ISPs) such as AT&T, for promotional purposes. The booths are designed to promote the distinctive features of their ISP service to travelers who already use the Internet, business people with a credit card in their pocket and time on their hands. This attempt to attract people away from competing ISPs may increase their market share, but does nothing to build a local mass base for e-commerce and distance learning.

The public terminals shown in FIG. 1 and disclosed in the '765 patent are notable in that they also provide employer-subsidized services used free of charge by the employer's traveling executives, who are identified by the credit cards, PIN numbers, etc. input to the terminal by the user: corporate voice mail, corporate e-mail, corporate shipping and receiving records, and a meeting schedule utility. The services available to the public from these booths are provided for use by affluent business travelers are designed for use by the employees as an extension of the computer network they use in their home office. As special purpose equipment, it is too expensive for use by novices and too intimidating to help build a mass base for e-commerce and distance learning. The requirement that the user have a credit card account in order to use such booths further reduces their usefulness in developing countries, as is discussed below.

Another paid multimedia communication service targeted at another affluent market is disclosed in U.S. Pat. No. 4,845,636. This is a private booth that has either a slow-scan video camera and dedicated PSTN telephone links, or a fast-scan video camera where broadband dedicated cable or microwave links are available, for use in upscale business transactions where face-to-face contact is desirable, such as car rentals. The great majority of those who do not have computers at home are also much more comfortable doing business with suppliers face-to-face They do not rent cars a such a service is too costly for casual use.

On the other hand, at the opposite end of the economic scale from traveling executives and their rental cars, U.S. Pat. No. 5,949,411 discloses a network of free kiosks that display promotional idle-time audio-visual clips taken from mass-market entertainment products, such as movies to the general public in public places. Each viewer is required to respond to market research questions that provide data for use in marketing such materials, using a touch-screen graphical user interface (GUI) on the display screen in order to view longer segments of that audio-visual material. In this way, the kiosk network is able to collect information about the demographics of its mass market, in addition to data on the selections viewed and responses to subsequent questions. The kiosk's idle-time displays of short clips, like the attract-mode displays provided by coin-operated video games in an arcade, are designed to encourage all people to interact with the computers to see a continuation of the clip being displayed. As with video games, the general public tends to find such an invitation irresistible, even if they've had no previous contact with computers. However, the operation of this kiosk network provides nothing to the viewer but amusement and nothing to the sponsor but market research. It does nothing to bridge the "digital divide" that hampers e-commerce.

E-commerce has become a very cost-effective means for achieving worldwide mass distribution of goods and services to customers in most developed countries, in part because the goods can be delivered directly from warehouses to the individual customer, which greatly reduces the seller's "bricks and mortar" capital investment and overhead expense. Unfortunately, the absence of a "bricks and mortar" base, reduces the usefulness of e-commerce itself in developing countries. Although e-commerce and internet communications are potentially important as economic development tools a very tangible presence and practical support services are needed. To date, cost-effective mass-based e-commerce has developed only where a mass of consumers are affluent enough to have the opportunity to become confident users of the worldwide web (www), what is commonly referred to as "The Internet". This additional investment in building and staffing local places of business is a commitment that conventional e-commerce sites, with their narrow or non-existent profit margins, are not likely to undertake even in the United States much less the developing countries.

How can e-commerce be extended to the disenfranchised population on the dark side of the "digital divide" so that these families can take full advantage of the potentially global and universally advantageous characteristics of the e-commerce market place in areas where purchasers are not accustomed to mail-order, much less e-commerce? First the hardware and software costs of reaching and educating new users must somehow be reduced or offset, before the savings available through mass distribution can be realized and the remote regions that have been left out of the country's economic development re-integrated into it.

Second, where mature mass-market infrastructure is absent, some form of personal and continuing, face-to-face and day-to-day contact to assure purchasers of the quality and reliability of e-commerce transactions is a practical necessity, not a luxury. Peculiarities of the economic infrastructure of developing countries frequently contribute to their relative economic isolation. In particular, securing payment for e-commerce purchases in developing countries is often problematic. In the United States, the security of conventional remote commercial transactions with consumers by telephone, mail, or the Internet, relies in part on the identification of the buyer's name with the telephone number or the internet service account that the buyer uses to make a purchase. Alternatively, the ship-to address given for the goods is correlated with the billing address of that telephone or Internet account and/or the billing address for the credit card used to make the purchase. However, as with gift orders, this is often not possible outside the industrialized countries of the world because many people do not use credit cards and the only billing address may be a Post Office box, not a street addresses.

Furthermore, in any international purchase, a buyer may prefer not to provide credit information to a foreign jurisdiction having commercial laws and customs that are unfamiliar to the buyer. Therefore, for many reasons, account verification for purchases sent to developing countries may not be available to the seller, or may not provide adequate assurance of payment for these purchases.

Securing the value received in such transactions is a matter of concern for both parties. From the merchant's point of view, in order for international mass-market e-commerce to be efficient enough to make its potential benefits a practical reality, rather than merely a theoretical possibility, it is necessary to provide assured payment for the goods and services delivered. This reduces its cost to the merchant by reducing the merchant's financial risk. From the buyer's point of view, suppliers who are located in any foreign country, including the United States, and who do not themselves have a local affiliate or other trusted local intermediary in the buyer's area, also need some way of assuring the buyer that the goods they are being asked to pay for will be received in good order and all warranties will be honored.

Mass-based exchange and customs brokerage services must also be implemented, services have customarily been provided only at the wholesale level for high volume transactions or high-priced goods. Again, implementation of such import/export services is likely to be most critically important for purchasers in the isolated local communities that have been the least likely to have had access to such services. These are also often people who lack the business connections and experience necessary to obtain such services at affordable rates, which further contributes to making e-commerce transactions unavailable to many people, worldwide.

SUMMARY OF THE INVENTION

The maturing of public-access computer technology, in particular the rugged and reliable equipment developed for banks, and the improved performance of e-commerce and streaming media protocols used on the world-wide web, has now reached the point where siting streaming media entertainment and communications applications in public places is physically feasible, but not economically attractive in its own right.

ISP internet terminals have been sited in airports and other public places. However, the features and operational methods of these ISPs and their public access terminals are alien technology to non-subscribers. Thus, the presence of ISPs' internet terminals in airports and other public areas has been, at best, merely a physical extension of the ISP's beggar-thy-neighbor advertizing campaigns competing for the lion's share of the given supply of current ISP users.

In accordance with the invention the kiosks provided by local e-commerce intranet operators and local businesses who support internet activities take e-commerce outside into those public spaces, not just c-commerce. The features and operation of video games and telecommunication links are neither alien nor intimidating to the general population, who acquire skills that are also useful for e-commerce when using them in the context of a simplified intranet environment, although they cannot afford to own such equipment. With security features, such as internet-independent call-back, charge-indicator warning apparatus, and over-the-counter pre-paid intranet accounts, combined with live on-line technical help and a walk-in mail-order support services, e-commerce download and mail-order transactions is no longer intimidating either.

The invention takes the internet outside into public spaces where high-volume usage that could pay for internet equipment is theoretically available. However, it brings e-commerce to areas where conventional ISP public-access terminals wouldn't have a chance to break even financially. Unlike single-purpose ISP terminals, the communications and entertainment e-commerce options implemented by the portals provide high volume usage needed to pay for the kiosks in development areas where the ISP-services market is not competitive, because of economics or historical/geographic accident, rather then leaving them out in the cold. The local walk-in component connected to the kiosks in the local intranet are its contact on the enabling the local franchisee to adapt its e-commerce services to such unique conditions and to the realities of the local economic and technical infrastructure. With this reconfiguration of the portals available to the general population, not just ISP market share but e-commerce activity and its mass base of people with the skills needed to use it is increased. Thus, the potential benefits of mass-based e-commerce beyond convenience, for the cost-effective distribution of goods, can be realized.

The present invention provides a public-access computer terminal having a credit card reader, a device that permits a user to specify alphanumeric and display-screen coordinate data, a floppy disc or other removable storage media drive unit, a printer unit, and a video camera. The computer is programmed to permit a user to selectably operate the units after the user enters a valid log-on ID, to establish a log-on ID for a new user after receiving answers manually input the computer by the new user in response to predetermined demographic questions, to test the validity of financial account information, PIN number and log-on ID entries made by users and to use said video camera to provide video-conferencing to the user. The computer has a telecommunications link that connects it to an e-commerce intranet providing free services to the user, said free services including information resources and access to selected e-commerce intranet sites and live contact with an intranet agent at a walk-in e-commerce service facility.

In a particular embodiment the portal has a switched second telecommunications link and the computer is programmed to initiate a call back over the switched link when a service selected by the user requires a fee to be paid by the user.

In another particular embodiment the portal includes a paid-service indicator adjacent to the card reader that indicates when paid services that have elapsed-time charges are being provided to the user.

Preferably the portal provides an idle-time display that includes full motion video entertainment clips, said computer re-initiating the idle-time display after a user enters a valid log-on ID when the user selects a free service and then does not make a further selection within a predetermined time period.

A particular embodiment of the portal provides an office service unit, and the computer is programmed to provide word processing services. In particular, the office service unit may include a laptop service unit that provides electric power and data connectors for use by a laptop computer.

In a further embodiment the portal has multiple carrels that are connected to a shared first telecommunications link, each carrel having a respective separate second call-back telecommunications link to transfer user ID and PIN number information between the e-commerce service facility and the user.

The portal preferably substitutes a log-on display for an idle-time display for a limited period of time. The portal also preferably includes means for limiting use of a free audio-visual service within a predetermined period of time.

The portal preferably selectably implements free demo displays that include one of the full motion video entertainment clips that are more extensive than the clip, but limits the frequency of the demo displays.

In a particular embodiment a portal may provide a booth that encloses both the user and the computer.

A public-access e-commerce service network in accordance with the present invention has a plurality of e-commerce portals, each portal including a computer adapted to read financial account information from a card, respond to alphanumeric and screen-coordinate information selected by the user, read data from and write data to a removable data storage medium, selectively print information for the user, and provide video-conference service to a user. The computer is programmed to permit a user to selectively operate the units after the user enters a valid log-on ID, to establish a log-on ID for a new user after receiving answers manually input to the computer by the new user in response to predetermined demographic questions, and to test the validity of financial account information, PIN number and log-on ID entries made by users. The public-access e-commerce service network also has a respective telecommunications link connecting each computer to an e-commerce intranet. The intranet provides free services to the user including information resources and user access to selected e-commerce sites, and to an e-commerce service facility.

Preferably the e-commerce service facility provides pre-paid accounts enabling users to obtain paid intranet services. In a particular embodiment the users obtain paid intranet services by using pre-paid cards. In a further embodiment the e-commerce service facility also provides paid e-commerce support services.

The method in accordance with the invention provides public access to e-commerce activities by providing a log on ID to a user upon receiving answers from the user to predetermined questions, selectable access to a plurality of paid and free services after validating a user ID entered by a user, including access to selected e-commerce intranet sites, and providing access to each paid service selected by a user after validating a respective PIN number entered by the user.

Again, preferably, the free services are provided to the user using a first link, and the log-on ID is provided to the user and the log on ID and PIN number are received from the user by using a separate, switched second communications link.

BRIEF DESCRIPTION OF THE DRAWINGS

The invention will be better understood when the disclosure of preferred embodiments provided below is considered in conjunction with the drawing provided, wherein.

In these drawings, similar structures are assigned similar reference numerals.

DETAILED DESCRIPTION OF THE PROFFERED EMBODIMENTS

Figure 1:
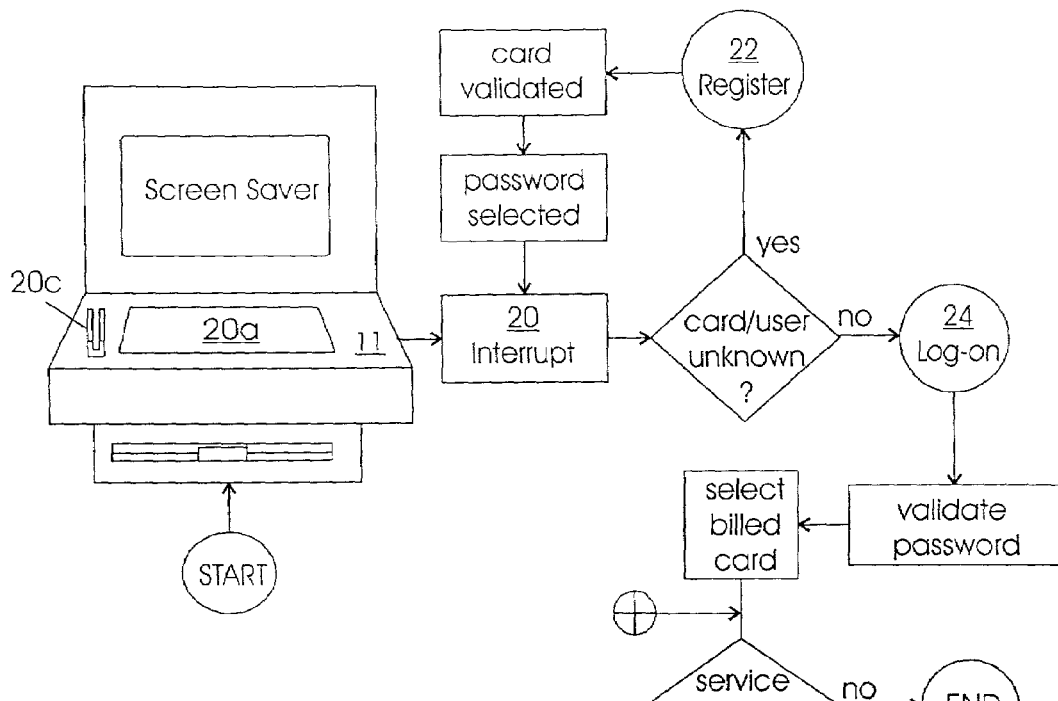
FIG. 1 is a system diagram of the services provided by a private-access internet portal in accordance with the prior art.
Figure 1:
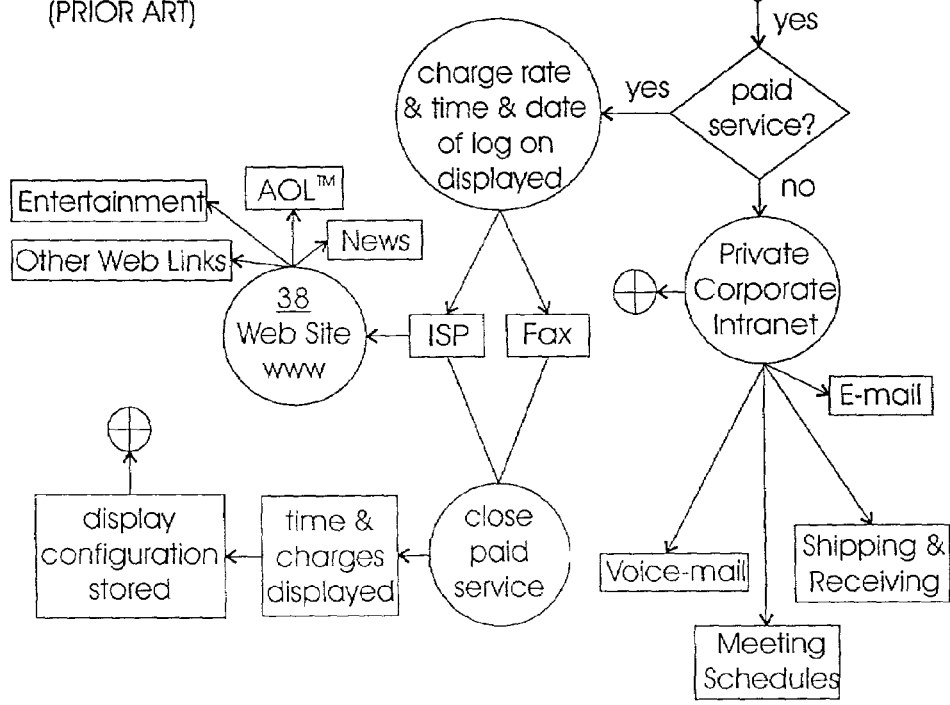
Figure 2:
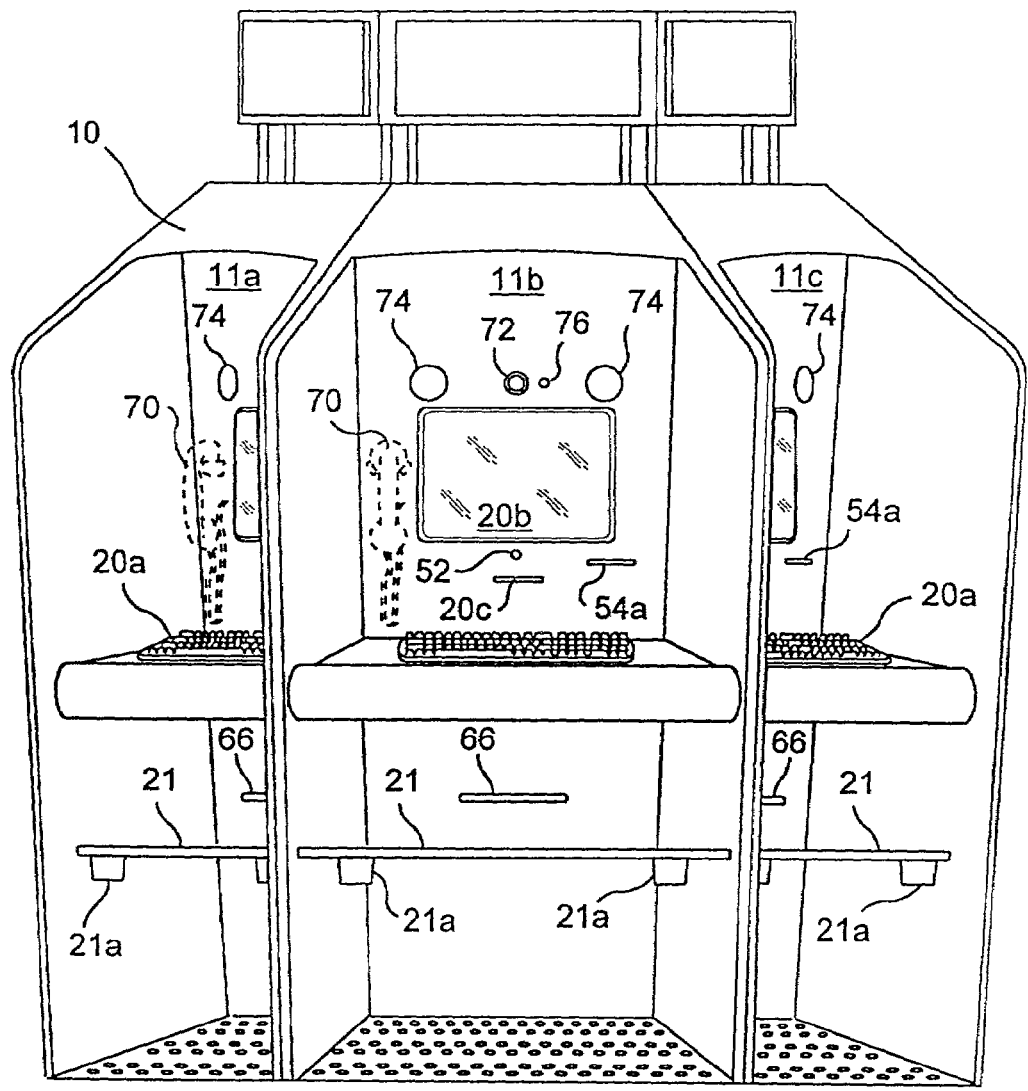
FIG. 2 is a schematic diagram of a kiosk providing a public-access internet portal in accordance with the present invention.
Figure 2A:
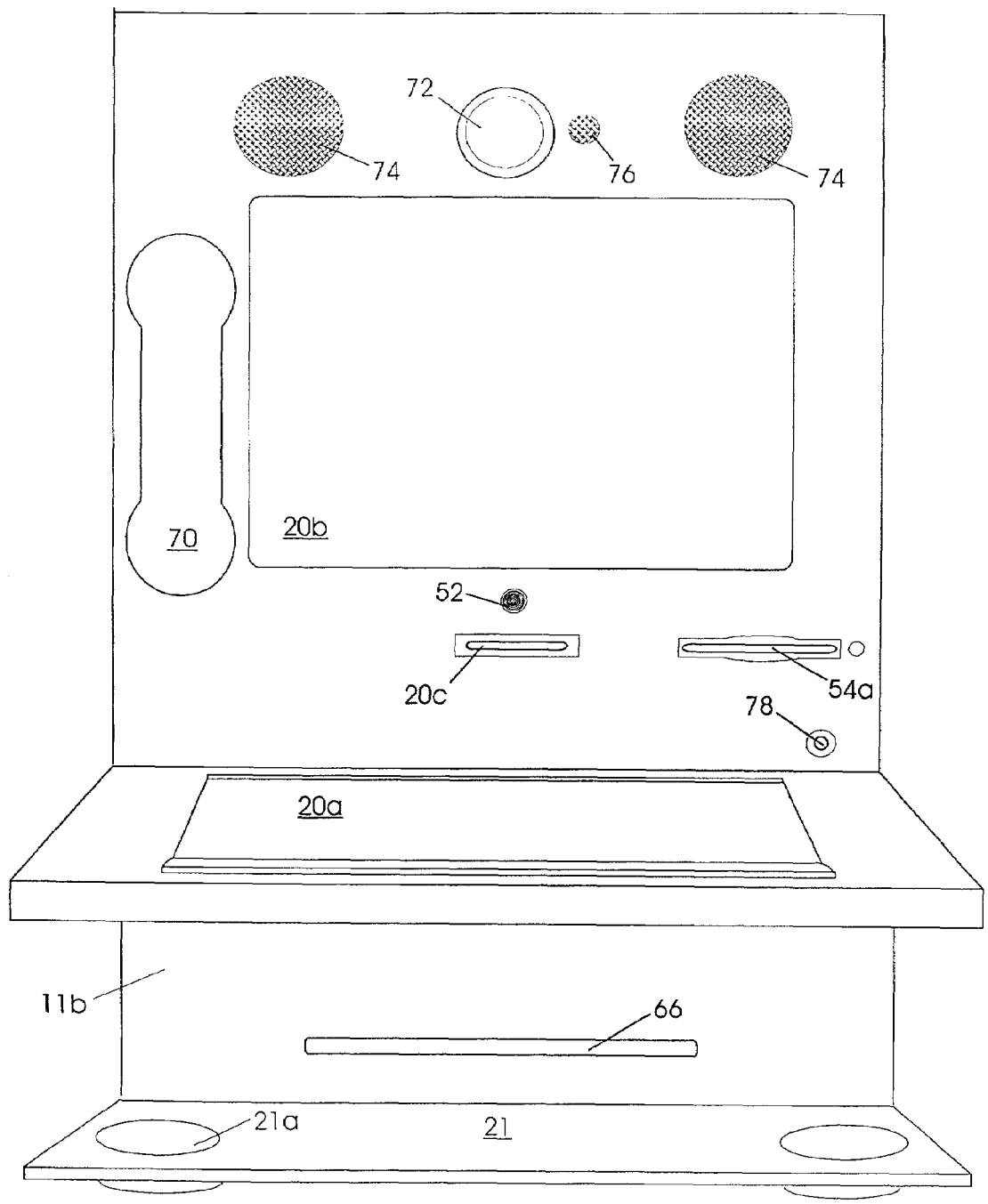
FIG. 2a is a schematic detail view of equipment provided in one of the carrels shown in FIG. 2.
Figure 3:
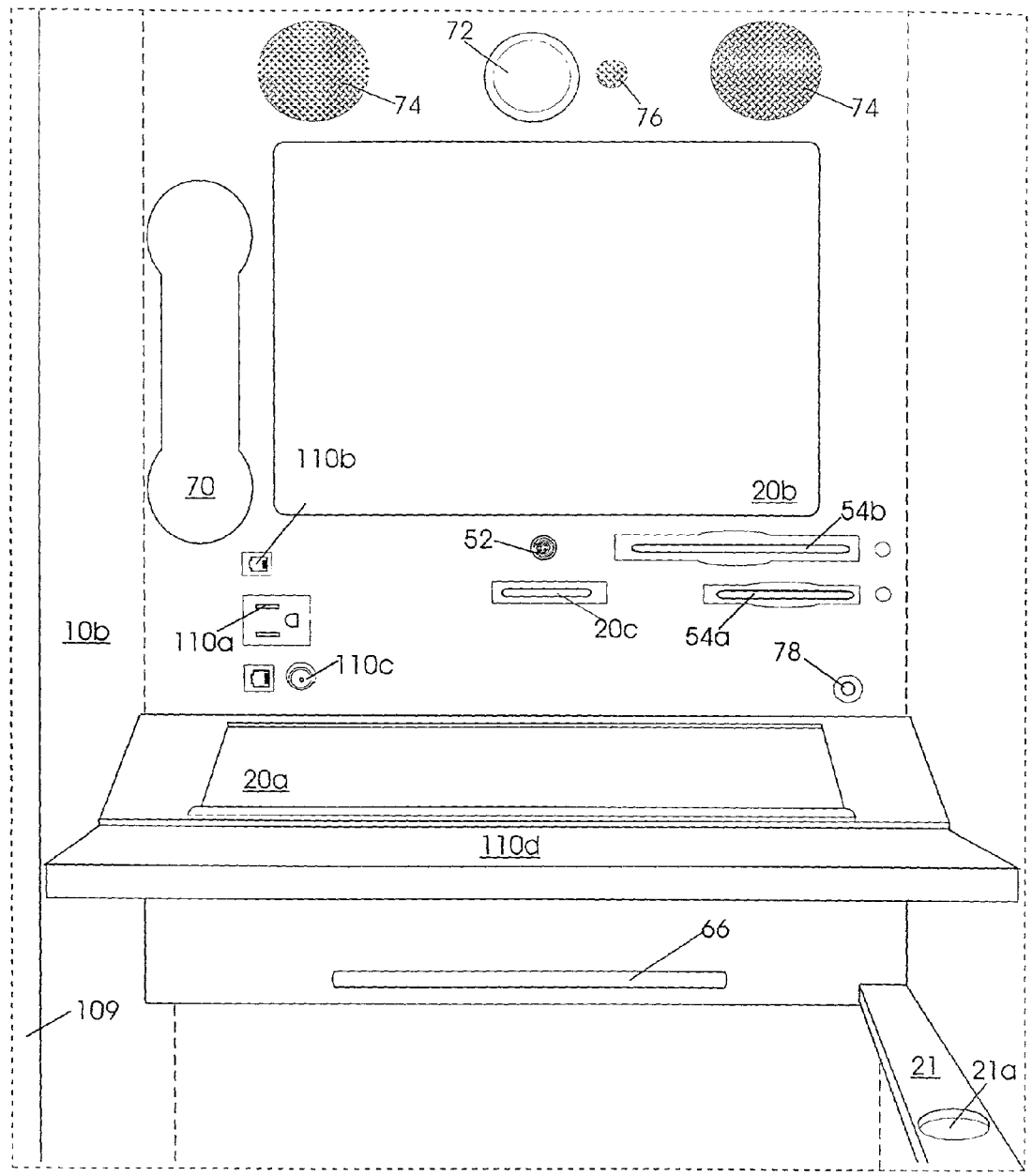
FIG. 3 is a schematic interior detail view of a private booth providing a public-access internet portal in accordance with the present invention.

Public portals 10 for an inter-urban mass market e-commerce development network 18, 18c in accordance with the present invention are shown in FIGS. 2 and 3. The portal 10a shown in FIG. 2 is an e-commerce-enabling media kiosk 10a designed for use in public places such as bus and train stations, airports, seaports, malls, supermarkets, repair shops, hotels, restaurants, cinemas, theaters, amusement parks, banks, hospital lobbies, pharmacies, schools, colleges, universities, office buildings, in parks, on sidewalks, generally in any place in the world where one might use a public phone. This particular kiosk 10aone suitable for placement in a busy shopping area, for example, has six carrels 11a-11f that provide six users simultaneous, independent access to computer-related services selected by each user. A just two carrels, or one carrel. A representative carrel 11b is described below with reference to FIG. 2a. The portal 10b shown in FIG. 3 is an enclosed booth connected to a local intranet 18 for use in the development network 18, 18c as a supplement to the kiosks 10a provided by the local development intranet 18.

Figure 4A:
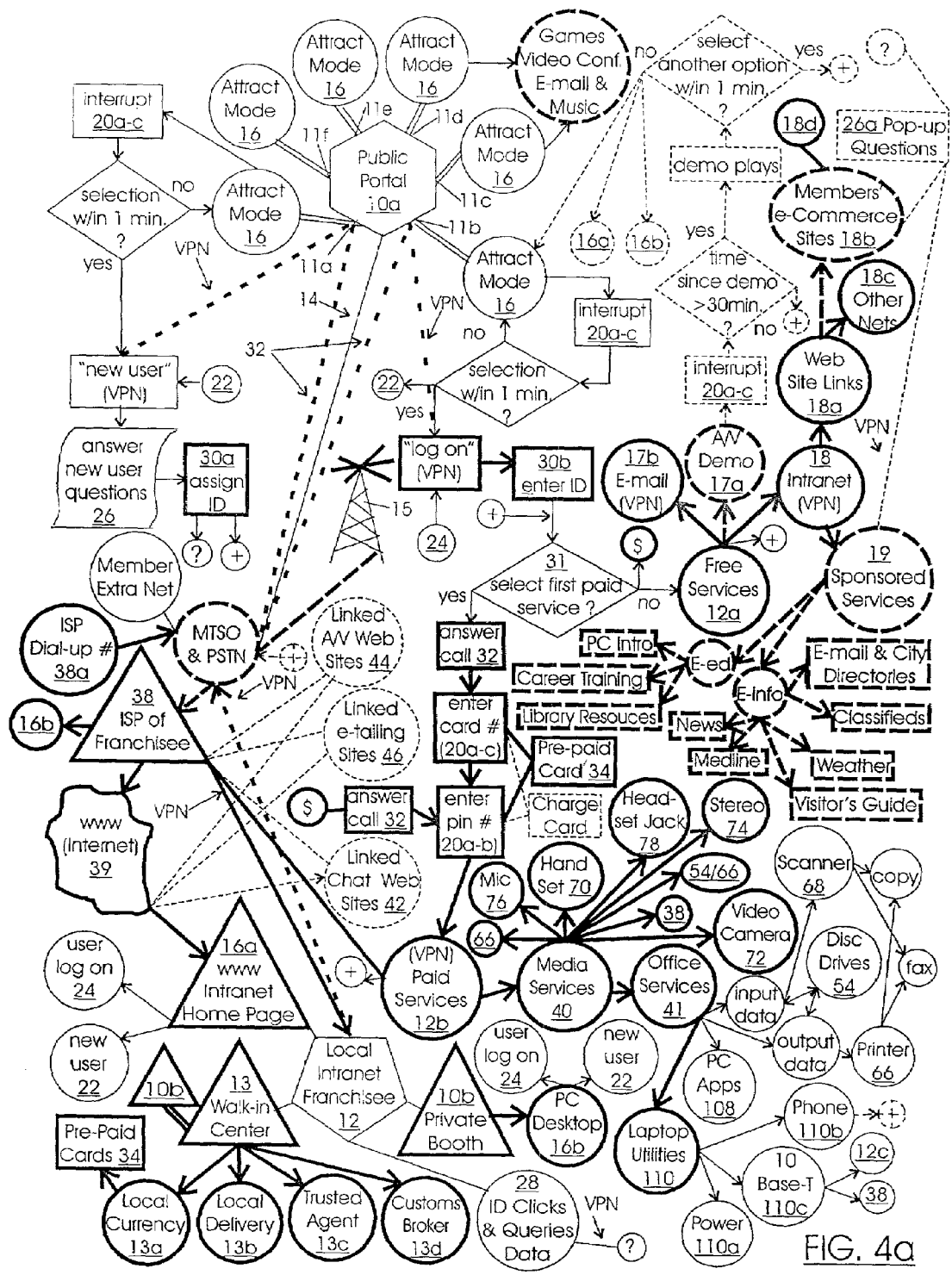
FIG. 4a is a system diagram of the services provided by a public-access e-commerce facility highlighting the security, entertainment and public service features provided in accordance with the present invention to attract new users so as to develop a local mass base for e-commerce and to supplement the local educational and communications infrastructure so as to catalyze economic development.
Figure 4B:
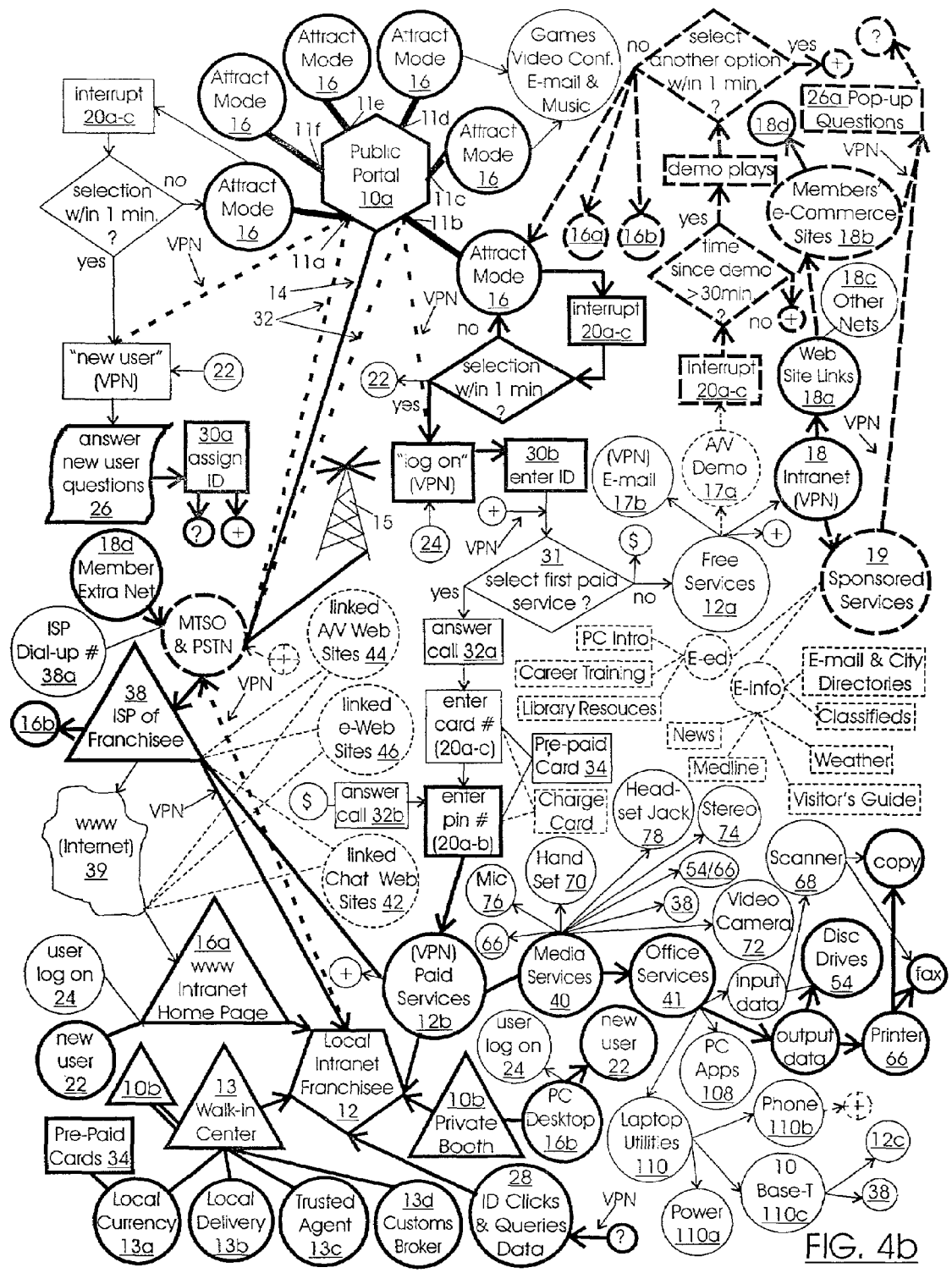
FIG. 4b is a system diagram of the services provided by a public-access e-commerce facility highlighting features that enable the deployment and maintenance of public-access e-commerce portals in accordance with the present invention.

With particular reference to FIGS. 4a and 4b, in a preferred embodiment of a local development intranet 18, portals 10 are owned or leased by a local franchisee 12. The public portals 10 are connected to the franchisee's premises 12 by a dedicated ISDN line 14 (i.e., IDSL) or other broadband telecommunications link: T1, DSL or video cable, for example, that serves all six carrels 11a-11f. The nature of this telecommunications link 14 will vary with local conditions, being satellite cellular or other forms of wireless communication, when necessary to reach remote areas that lack other forms of digital telecommunications service. The dedicated broadband telecommunications link 14 is used by the franchisee 12 to support free services provided by the carrels 11. For example the dedicated link is used to update the attract mode display 16, to monitor the carrels' condition, and to provide the user access to live on-line technical support for the operation of the portals 10. The local intranet 18 also provides a walk-in e-commerce service counter or service center 13 within the local community. The walk-in center provides customer service in person at that location 13, and free access by telephone, video-conference or on-line text chat exchanges between the franchisee's customer support staff at the walk-in centers 13 and the portals 10.

Each idle carrel 11 in the kiosk provides a display 16 that combines full motion video providing excerpts of audio-visual entertainment and advertising the development network's video-conferencing services, with screen-saver or desktop-type, relatively static images. The full-motion video ads promote audio-visual material such as games, movies and music videos, and the portals' paid video-conferencing and e-commerce services. The static images summarize other services provided by the local intranet and invite the user to log on. To attract local foot traffic, the kiosk also provides location-specific information such as weather forecasts, resources for visitors to the neighborhood in which the portal is located, particularly local businesses, and local movie show times. However the display's purpose is to persuade passers-by to register with the intranet, and to logon to the intranet and use it to become comfortable with and regular users of e-commerce. One/way in which passers-by can be encouraged to log-on is by offering supplements to the idle-time display 16 as a free public service 12a, explaining that the information and other sponsored services 19 are provided in greater detail to these passers-by after they register as users 30a and then log on 30b.

Product and service advertising banners and other inclusion reflecting material on the web sites of members 18b who underwrite the public service information and training programs 19 is also included on the display screen from time to time while the respective member's material 19 is displayed. As a further attraction to new users, and a convenience to member's customers, the carrels may also enable intranet members to provide free and paid convenience services to users, such as restaurant reservations and ticketing for movies, to users who are registered and logged on to one of the portals 10.

The services 12a, 12b described by the kiosk's idle-time display 16 include free e-mail services 17b and free intranet browsing using links 18a to members' e-commerce web sites 18b, and to the intranets 18c of franchisees 12 in other geographic locations and to education and information resources 19 sponsored by members of the local intranet as a public-service, including community bulletin boards and directories for the intranet community of users and advertiser-members. Product and service advertising banners and other inclusion reflecting material on the web sites of members 18b who underwrite the public service information and training programs 19 is also included on the display screen from time to time while the respective member's material 19 is displayed.

The clips of third-party video games, music videos, movie trailers, and cabarets or other theatrical productions 17a that provide audio-visual elements used in the attract mode as the full-motion segments are also available for on-line preview in a longer "demo" format 17a that is provided to logged-on carrel users can audition for free. As a further convenience for customers of intranet members 18b, carrel users who have logged on may also be provided links to free 12a and paid 12b services related to that same third-party advertising, such as reservations 19 and printing tickets 66 for performances, at that kiosk 10a or any of the other portals 10. However, although the full, published form of recordings represented by the demos 17a will be available to logged-on users from the intranet 18 for purchase by mail order or download onto a floppy disc or other removable recording medium 54, they are merely a few of the many entertainment products available both from members and third-parties 18b, 42. 44, through the e-commerce services of the local intranet S8.

In contrast to booths 10bthe principal purpose of the kiosks 10a is to build a mass base of computer-literate consumers in the local population and provide local mass-market research statistics needed by all e-commerce retailers to plan for the inventory they'll need, information e-retailers pay a high price to obtain. For this reason even though these demos are shorter than the commercially published versions, only one of the demos can be played in any given ten-minute interval by any one user, to assure the carrel remains accessible for the revenue generating activities that support its existence while still providing an attractive level of free service. In either case, 10a, 10b, these public e-commerce portals provide the general public an easily accessible point of entry, a doorway to local development of mass-market e-commerce by each intranet, not merely advertizing space for its members.

Similarly, the clickstream and demographic data 28 generated by the portals 10 is useful to intranet members and to the franchisee, as indicated in FIG. 4b. However, this data covers all browser activity on the portal, including Internet browsing, not just visits to the members' intranet sites. Thus it is valuable to others who may consider investing in the local area and the franchisee's sale of such research data to other businesses can provide one of the income streams it needs to support the portals. Additionally, the portal 10 may receive revenue from members when users elect to receive promotional e-mails for merchandise promoted by advertisers or use the portal's printer 66 to make a copy of materials available from an e-commerce web site.

The franchisee 12 who maintains the portals 10 and a walk-in center 13 in a respective local territory is also the proprietor of a respective local promotional intranet web site 18 on an international e-commerce intranet 18a, 18c. Users can browse the respective franchisee's and members' web sites 18, 18b, on this internet for free, once they have logged in using a valid ID. The contents each site 18, 18b, is designed for the language and informational needs of users in the respective local franchise territory, as is the local portals' home page 16b, as determined by the franchisee 12. Thus Tagalog may be the language of the attract mode display 16a and the local intranet web sites 12b for some areas of the Philippines, although Spanish may be the language used for the desktop and service options displayed by the booths 10b that are provided to business travelers by the same franchisee 12.

The interrupt 20a-c is generated whenever a user presses any key on the keyboard 20a provided by the carrel 11, or when the user presses a "button" image shown in a screen saver image on the display screen 20b, thereby clicking on a selected link, or touches any part of the screen during a full motion display. The computer in the carrel 11 responds to an interrupt 20a-c occurring during the idle-time display 16, by bringing up the carrel's "log-on" options screen 22, 24 on the display screen 20b, shown in FIG. 2a. Once the log-on options screen 22, 24 appears, the carrel 11 allows the user one minute within which to select either the "new user" option 22 or the "log on" option 24 as illustrated at carrel 11a in FIGS. 4a and 4b. If the user selects neither one of these options within one minute, the idle-time display 16 returns to the screen 20b, so that the carrel 11 remains accessible to other users.

If the user already has an ID, the user selects the "log on" option 24, as illustrated at carrel 10b. Users are then prompted to enter their e-commerce intranet IDs 30b and the password for the respective ID. When "new user" 22 is selected, as illustrated at carrel 11a, the user is asked to complete a registration questionnaire 26. The questionnaire 26 is used by the e-commerce center 12 in combination with subsequent responses to questions 26a, and the user's cumulative clickstream, to determine local e-commerce market demographics, as noted at 28. The new users then receive an e-commerce intranet ID 30a, and a password for that ID that allows them to anonymously access any of the free e-commerce intranet services 12a. This ID is thereafter also used to anonymously record the selections made by the user at the carrel 11 as a "clickstream" associated with the other anonymous demographic information 28 obtained from the user by questionnaires 26, 26a.

In particular, multiple pop-up questionnaires 26a specific to particular members' marketing concerns can be inserted in their sponsored material 19, in addition to the general demographic information provided by the franchisees 12, to focus the demographics used to interpret the clickstream data generated by their respective sites 12a in relation to the general information available from the new user questionnaire. Because the new user questionnaire 26 includes no identifying information, just categories needed for demographic market analysis 28, the user is assured of privacy in using member's services on the portal's e-commerce intranet.

Once a user's e-commerce intranet ID 30b is verified, the screen 20b displays a list of the portal's locally-defined service options 12a. The local portal also maintains a location-specific "home page". Similar to the portals' service options web pages 12a, 12b, local franchisees 12 provide respective intranet homepages 16a which list the franchisee's ISP 38 and e-commerce services 13a-13d, and the intranet's free services 12a, but not location specific information or paid services that charge for use of a carrels' media facilities 40 or a booth's office facilities 41. The intranet homepage of the e-commerce development network 16a can be accessed either through a local portal's free list of the intranet's own internal list of worldwide html links 18a on the portal's intranet home page 18, or obtaining access to the Internet (www) 39 through connection through a LAN to an internet server, or by dialing up 39a the local franchisee's ISP 38 or any other gateway and going to the URL of that homepage 16a.

The www homepage 16a for the e-commerce development intranet, like the local intranets' home pages 18, 18c, may provide users worldwide access to selected local services independent of the portals. Like the log-on options provided by the portals 10, the "www" e-commerce development network home page 16a should require such users to log in before it provides services other than the list of intranet links 18a to franchisee's e-commerce service web sites 18, 18c, where the user may log on to obtain their respective services. This helps preserve the coherence of data that can be used to show the network's overall impact on e-commerce activity in addition to the valuable market demographics 28 provided by the franchisee's clickstream and questionnaire data, an important local revenue stream for maintaining intranet portals 10. The overall impact the network 18, 18c can have on local economic conditions is an important part of the picture needed to recruit new franchisees 12. The presence of a searchable homepage 16a on the internationally popular public Internet for the e-commerce development network as a whole, is a unique opportunity to make its accomplishments and those of its local franchisees known to potential members and investors.

Preferably, the booths 10b provided by the franchisee 12 display a screen saver rather than the portal's full-motion video idle-time material. The screen saver includes a "desktop" 16b image showing services that are available from the booth. However, like the kiosk 10a, both free 12a and paid 12b services are substantially unavailable from the booth 10b to users who have not logged on 30b to the intranet. The local franchisee's intranet homepage 18 for the e-commerce development network 18, 18c, may also provide this type of screen saver display before visitors to the network's www web site or users logged on to some other intranet 18c, log on to the local intranet that offers those services. All users must be logged on locally before any service options can be selected , free or otherwise, to preserve the integrity and usefulness of their additions to the clickstream data base. That is, the desktop 16b that actually provides the user access to the franchisee's free intranet services 12a, paid ISP service 38 and other paid services 40, 41, is not displayed until the user's log-on ID entry 30b is accepted as valid.

Because of the greater privacy provided by the booths, their multimedia facilities may be advantageously made available to users in off-peak hours for auditing distance-learning classes and recorded multimedia educational material, e.g., subsidized self-paced high school equivalency studies or foreign language training, as a public service. In this way the booths supplement the attract-mode function of the kiosks with opportunities for more extensive training. The booths 10b also provide access to the e-commerce intranet and its free services and the paid e-commerce support services provided by the local franchisee 12.

If the service 12a selected by a user at the portal 10 is a free service, the carrel 11 continues to operate using the dedicated telecommunications link 14. If the service selected by a user at either a booth 10b or a carrel 11 is one for which the e-commerce intranet e-commerce center 12 that maintains the e-commerce intranet portal 10 charges a fee, the e-commerce intranet e-center 12 initiates a switched call to the user's carrel 10b which establishes a private link 32 between the e-center 12 and the user. This link 32 uses a public switched telephone network (PSTN), or a mobile telephone switching office (MTSO) link for digital cellular service 15, or any other suitable type of switched private link 32.

The e-commerce center 12 may also initiate a call back to the user in the individual carrel when the "new user" option 22 is selected, to authenticate the user's location and to provide additional privacy. The booth 10b may also use a call-back line (not shown) similar to the ones 32 used by the carrels 11, both to authenticate the user's location and protect the user's privacy in financial transactions. Furthermore, auxiliary switched service, such as a cellular phone number, may be personally designated by the user for use when a link is implemented to the ISP 38 or the Intranet's home page 16a from an access point other than the franchisee's carrels 11 or booths 10b, and/or preferred for use in place of the franchisee's switched lines 32, when answering the new user questions 26 or when visiting a walk-in center 13. A carrel's inputs are automatically isolated from the carrel's intranet connection 14 while the carrel's call-back line is active, to positively implement the required privacy, however, this does not occur when the telephone number and keypad of the user's personal mobile communications device is used for a call back operation. Initiating a call back by the franchisee 12 to a number designated before the current portal session for entering any account PIN#'s that must be entered, provides security from users in adjacent channel of the same connection eavesdropping on such a data exchange without incurring the expense of providing separate high-bandwidth connections to groups of carrels or booths just to secure what may be merely a sequence of narrow-band dual-tone multiple-frequency (DTMF) "touch tone" PIN# signals.

When the call back 32 is used in combination with dynamic IP address allocation, the call back 32 may also initiate a reassignment of the IP address associated with that user on the ISP's address table, that provides a level of security over and above what is provided by the "tunneling" that secures the log-on information transferred by VPN links over the dedicated link. Dynamic reassignment further reduces the likelihood that unauthorized parties will have enough time, during the period in which each of the multiple addresses is used during a session, to access or otherwise interfere with a user's e-commerce transactions.

The user's card number, and the pin number required for that charge card, are entered and verified using the separate switched link 32. Alternatively, prepaid cards 34 issued by the franchisee's e-commerce walk-in center 13 in connection with its foreign exchange services 13a may be used instead of a charge card. These pre-paid cards have two advantages: 1) They permit members of the public who do not have the assets required to obtain reasonable credit card rates, and those who otherwise have no need for such credit card services, to make international purchases over the Internet. 2) They are associated only with the user's e-commerce intranet ID and an account and pin number assigned to the card by the local franchisee 12 before the pre-paid card 34 was issued for sale. The user's e-commerce intranet ID may either allow the merchant to forward promotional material directly to the user's free e-mail box or may be a restricted-use ID that is usable only by the franchisee to communicate with a user who chooses to both be anonymous and not to receive promotional e-mail for discounts and sweepstakes, etc. Alternatively, the user may open a separate e-mail account, with a separate ID, for receiving such material.

Once the user's account status is verified in any given intranet session, only the pin number for that user's account is entered by the user each time a paid service is selected, so long as the user remains logged on. While paid services are not in use, users are automatically logged off, whenever more than ten minutes elapses without another user selection, or more than 1 minute passes after a demo is played before another service is selected, as indicated at carrel 11b in FIGS. 4a and 4b. However, increased time may be allotted when the user selects free intranet services that are sponsored by members who pay a premium membership rate to the intranet's franchisee 12.

To help new users control the cost of these sessions where either paid or free options may be used, a pilot light 52 is provided. The pilot light 52 lights whenever a fee is being charged for time spent using the carrel 11, to reassure users who have limited financial resources, by clearly distinguishing the free computer time from the fee-bearing services provided by the portals 10. Alternatively, text or an icon displayed on the screen 20b, preferably near the card reader 52, would provide this indication in place of the pilot light 52.

For a fee, the portal 10 provides media services 40 such as voice and video telephony, chat room connections 42 and also previews and downloads of the complete published form of the third-party PC games and music videos 44 that provided the clips used in the attract mode display. For a fee, the franchisee 12 also supports e-commerce transactions with e-commerce sites 46, provides for pickup and local delivery 13b of packages and, at little or no cost, of e-mail 17b sent by the user to the center 13 and specifying the intended recipient's street address. In addition to advertising their services by expediting users' e-mail messages to recipients who as yet do not have an e-mail account, and providing technical support for the portals' users, the centers may also provide specialized or high-volume office-automation services such as computer-based graphics, or mail merge and batch copying. The e-mail 16a sent to the free e-mail account corresponding to a user's e-commerce intranet ID can be read on the screen 20b after logging in using that ID at any of the carrels 11 on the portal 10, and a then saved to floppy disk 54a or printed out 66 by the user. The user's e-mail can also be read or downloaded from a booth 10b or the network's www web site 16a. For ease of use, the carrels' display screens 20b are touch sensitive screens, but a keyboard 20a is also provided in each carrel 11 for the user's convenience, as shown in FIGS. 2a and 3, particularly for drafting e-mail messages.

In addition to currency exchange 13a and pre-paid cards 34, the walk-in e-commerce center 13, as part of an international network 18 of e-commerce franchises, further supports users' e-commerce activity by serving as a trusted transaction agent 13c in interstate and international sales who certifies merchants and collects payment, to assure payment for and delivery of purchases in good order, provides for merchandise returns and refunds, and serves as a customs broker 13d for international e-commerce purchases. Thus, through the walk-in center 13 the portal 10 provides the new user and e-commerce support services that are most needed in smaller countries where mass-based e-commerce is necessarily international commerce, so that exchange rates and customs clearance are immediate barriers to users' participation in this marketplace.

Because the paid media services 40 offered by the portals 10 provide immediately understandable, highly-desirable opportunities for virtual "visits" with family and friends who have moved out of the local community, they are introduced to the portal's charge and payment arrangements as well as enjoying multimedia services that individual users could not otherwise afford. This and the free promotional third-party audio-visual materials also offered by the portals 10 that attract interest in using the portals 10. The opportunity to obtain these popular materials, for free, or for a merely marginal price rather than having to buy the multimedia equipment itself, gives passers-by an immediate incentive to try to use the portal 10.

Beyond the incidental computer experience gained by selecting demo recordings 17a and paying for video-conferencing services 40 or the full commercial recording 44 of an audio-visual performance auditioned by the user as a demo, the free e-mail facility available through the portal provides users the option of receiving advertisements for selected goods and services and for inclusion in the intranet's user directory. The portal's intranet also provides computer training in the form of a brief interactive introduction to personal computers (PCs) that helps prepare first-time users for making purchases of travel and movie tickets on line, using their free online e-mail account, medical and academic reference materials, news, weather, classified ads and directory services, in one or more of the local languages. Free interactive training in using PC word processing and data management programs the may also be provided by the franchisee to help prepare users for operating standard business software 108, such as that provided by the franchisee's booths 10b, as indicated in FIG. 3.

To use the carrel's paid Internet 38 and media 40 services the user inserts a personal credit or debit card, or a prepaid card 34 into the card slot 20c once, after the logging in, or enters their card's account number 20a, 20b. Preferably, the prepaid cards are single-use cards. These single-use cards establish a credit balance and are cancelled when swiped, protecting the public by reducing the opportunity for theft and re-use of the card.

When credit is established, the credit available is displayed on the screen. The credit available is adjusted and re-displayed after each transaction and is displayed at any other time during the same session upon request of the user. Any remaining pre-paid balance may be credited to the user's ID at the end of the current session. After logging on and choosing paid media services, when the user chooses to make a purchase from a member's site 18b only the PIN number of the account being used and the specification of the item purchased need to be entered by the purchaser. The merchant will then supply an order confirmation number and the purchase specification will be printed out with the order confirmation number and merchant and transaction reference numbers supplied by the portal as the user's receipt for purchase, to be used to pick up the goods or for tracking their delivery.

The user can then either use the familiar handset 70 to place an Internet telephone call or place a video conference call to any carrel 11 on the worldwide intranet using the video camera 72 and either the handset 70 or the microphone and speakers 74, 76. The handset 70 is particularly helpful to new users when they request a call back from the walk-in center 13 for technical assistance in using the booth. A headset jack 78 is also provided in each carrel for use with headphones provided by the user, available for sale from the franchisee's walk-in center 13, or for free as a promotional item supplied by any one of the intranet's participants.

From the viewpoint of the local e-commerce intranet franchisee 12 from whom the prepaid card was purchased, and who provides sellers guaranteed payment for the goods and services charged to that card, the cards provide a source of income. The intranet members provide the entertainment, educational and communications services of the portal that build the user traffic at the portals. Increased e-commerce activity of any type at the portals increases the value of the intranet and its walk-in center 13 to the franchisee 12 and to its members 18b.

Because, unlike the kiosk-type e-commerce intranet portals 10, these booths 10b are a convenience for members of the public who already own and use personal computers, the booths 10b provide the user popular PC business application software 108 that is ready for use, and scanner-based facilities for faxing and copying to paper, as well as printing, ZIP-drive or super-disc drive and CD-drive facilities 54b. The booths 10b may also provide laptop utilities 110a-d that enable business people who, have their own laptops, PDA data bases or other portable computing resources with them to work in the privacy of the booth 10b with the door 109 closed. For example, a surge-protected power outlet 110a is provided to recharge laptop batteries, and an IR link and/or RJ-11/RJ-45 connectors provide computer communication links for dial-up online database or ISP access 11b. Alternatively, RJ-45 or BNC connectors provide LAN-based access 110c to the franchisee's free intranet and paid media and ISP services 40, 38, as shown in FIG. 3. The booth's disc drives 54, printer 66 and scanner 68. Thus the free and paid local e-commerce intranet services provided by the computer in the booth 12b will also be available through the connection provided by the laptop utilities 110. The "travel office" booths 10b are well-suited to transportation hubs such as airports and train stations, where business people may need a place to work during lengthy layovers.

To promote use of the local franchisee's services by travelers, and to enable users to implement video-conferences with another portal or booth, the local e-commerce development network's web site 18 includes individual pages 18c that each provide a description of the location and services provided by the intranets 18c of other franchisees of the e-commerce network 18, 18c. Each franchisee 12 has a respective assigned local territory and its own e-commerce intranet 18 of members 18b who sponsor free services 19 suitable to local needs identified by the respective franchisee 12. The members 18b communicate with the franchisee over a secure dial-up extra net 18d for arranging royalty payments on sales transacted over the local net 18 or for subscription payments in lieu of providing free sponsored services 19.

When users visit the network's worldwide web (www) homepage 16a and select one of the log on options 22, 24, or a link to a local intranet 18, a screen-saver display similar to the booth desktop 16b appears, VPN encryption and a security protocol such as "https:\\" are activated. However, unlike the kiosks 10a and the booths 10b, verifiable credit information may be required if a pre-defined call back link is not used. Also, the intranet's paid services list 12b that appears after the user has successfully logged onto the intranet website 18 does not include the office and media 40 services that charge fees for use of equipment provided by the portals 10 as distinct from the equipment used by a franchisee's ISP or Intranet site 18.

Both the publicly-available www network homepage 16a, and the dial-up access 38a to the intranet's ISP service 38, provide the added convenience of "user extranets" that give experience intranet users freedom to access the intranet from home or the office, anywhere their computer can access either the Internet or the ISP's dial-up line, when these users do acquire the necessary equipment. Thus the basic e-commerce support services provided by the portal 10 continue to be accessible to users after they no longer need to use public portals to be have personal access internet services.

In accordance with the present invention first-time computer users are provided opportunity to become familiar with the use of computer terminals through use of free e-mail and intranet browser services and to explore the uses of cost-effective e-commerce by purchasing entertainment and video conference services that have mass-based appeal, as well as a free opportunity to free on-line research and educational services within an intranet that provides them with the best of both worlds: highly interactive and efficient high-tech communication gear and reassuring over-the-counter advice and user-friendly pre-paid credit. The game and music demos 17 and the time allotted for log in are both controlled to assure the carrels 11 remain accessible for public service user sessions, as well as for paid uses. This assures that, except for brief demos of games and music and a one-minute waiting time, each carrel in e-commerce intranet and each carrel 11 on the portal 10 will be either in the attract mode or providing paid services or providing free franchisee and member-subsidized public service options to the public. Thus controlling such waiting time between user selections also maximizes the clickstream information gathered for each e-commerce intranet ID 30b logged in at each carrel 11, as well as assuring continued profitability for the franchisee, as indicated in FIG. 3. However it also improves the likelihood that new users will have a chance to explore the benefits offered by the carrels 11, as indicated in FIG. 2.

The invention has been described with particular reference to particular presently-preferred embodiments thereof. However, it will be apparent to one skilled in the art that variations and modifications are possible within the spirit and scope of the invention which is defined by the claims appended below. For example, in addition to operating a walk-in center and kiosks for developing mass-based e-commerce, a franchisee may also be a local retailer, a local office of an international non-governmental development agency (NGO) or an agency of local government.

I claim:

1. A public-access e-commerce service portal providing a user access to an internet, said portal comprising:
   a computer including a display screen, a card reader adapted to read financial account information from a card, an input device adapted to provide alphanumeric and screen-coordinate information selected by the user, a drive unit adapted to read data from and write data to a removable data storage medium, and a printer unit, said computer being programmed to permit a user to selectively operate the units after said user enters a valid log-on ID or to establish a log-on ID for a new user after receiving answers manually input to the computer by the new user in response to predetermined demographic questions, and said computer being programmed to test the validity of financial account information, PIN number and log-on ID entries made by users;
   a video camera, which inputs video images, connected to the computer, said computer being programmed to use said video camera to provide video-conference service to the user;
   a telecommunications link adapted to connect the computer to an e-commerce intranet providing free services to the user, said free services including information resources and free access to selected e-commerce intranet sites and contact with an intranet agent at an e-commerce service facility, the telecommunications link also being adapted to connect the computer to the internet to thereby provide the user access to the internet; and
   a service unit including electric power and data connectors for use by a portable computing device.

2. The portal of claim 1 further comprising a second telecommunications link, said second link being a switched link, said computer being further programmed to initiate a call back over the switched link when a service selected by the user requires a fee to be paid by the user.

3. The portal of claim 1 further comprising a paid-service indicator adjacent said card reader, said indicator connected to the computer to indicate when the computer is providing a paid service that has elapsed-time charges.

4. The portal of claim 1 wherein the computer is programmed to provide an idle-time display including full motion video entertainment clips, said computer re-initiating the idle-time display after a user enters a valid log-on ID after the user selects a free service and then does not make a further selection within a predetermined time period.

5. The portal of claim 1 further comprising an office service unit, said computer being programmed to provide word processing services.

6. The portal of claim 1 further comprising multiple carrels, said carrels being connected to a shared first link and adapted to respond to a respective separate second call-back telecommunications link to transfer user ID and PIN number information between the e-commerce service facility and the user.

7. The portal of claim 1, further comprising means for substituting a log-on display for an idle-time display for a limited period of time.

8. The portal of claim 1 further comprising means for limiting use of a free audio-visual service within a predetermined period of time.

9. The portal of claim 1 further comprising demo means for selectably implementing free demo displays including a full motion video entertainment clip, said demo displays being more extensive than said clip, and means for limiting the frequency of implementing said free demo.

10. The portal of claim 1 further comprising a private booth adapted to enclose a user and said computer.

11. A public-access c-commerce service network, said, network comprising:
   a plurality of e-commerce portals, each portal having a video camera that inputs video images, a computer adapted to read financial account information from a card, respond to alphanumeric and screen-coordinate information selected by the user, read data from and write data to a removable data storage medium, selectively print information for the user, and provide video-conference service to a user, said computer being programmed to permit a user to selectively operate the units after said user enters a valid log-on ID or to establish a log-on ID for a new user after receiving answers manually input to the computer by the new user in response to predetermined demographic questions, and programmed to test the validity of financial account information, PIN number and log-on ID entries made by users;
   a respective telecommunications link adapted to connect each of the computers to an e-commerce intranet, said intranet providing free services to the user, said free services including information resources sponsored by members of the intranet, and user access to selected e-commerce intranet sites, and to an e-commerce service facility, said telecommunications link also being adapted to connect the computer to an internet to thereby provide the user access to the internet; and a service unit including electric power and data connectors for use by a portable computing device.

12. The network of claim 11 wherein said intranet service facility provides pre-paid accounts enabling users to obtain paid intranet services.

13. The network of claim 12 wherein said intranet service facility provides pre-paid cards enabling users to obtain paid intranet services.

14. The network of claim 11 wherein said intranet service facility further comprises means for providing paid e-commerce support services.

15. A method of providing public access to e-commerce activities through an e-commerce service portal including an information processing apparatus and a telecommunications link, the method comprising the steps of:

providing a log-on ID to a user upon receiving answers from the user to predetermined questions;

providing selectable access to a plurality of paid and free services after validating a user ID entered by a user, said free services including access to selected e-commerce intranet sites, said paid services including video-conference service using a video camera that inputs video images;

providing access to each paid service selected by a user after validating a respective PIN number entered by the user;

providing access to an internet through the telecommunications link connected to the information processing apparatus; and providing electric power and data connectors for use by a portable computing device.

16. The method of claim 15 wherein the portal provides a plurality of free services to the user using a first link, and provides the log-on ID to the user and receives the log on ID and PIN number from the user by using a separate, switched second communications link.

* * * * *